(12) United States Patent
Flannery et al.

(10) Patent No.: US 7,919,879 B2
(45) Date of Patent: Apr. 5, 2011

(54) POWER CONDITIONING ARCHITECTURE FOR A WIND TURBINE

(75) Inventors: Patrick S. Flannery, Madison, WI (US); Venkata Giri Venkataramanan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 100 days.

(21) Appl. No.: 11/809,223

(22) Filed: May 31, 2007

(65) Prior Publication Data

US 2007/0278797 A1 Dec. 6, 2007

Related U.S. Application Data

(60) Provisional application No. 60/809,737, filed on May 31, 2006.

(51) Int. Cl.
*F03D 9/00* (2006.01)
*H02P 9/04* (2006.01)

(52) U.S. Cl. ............................................. 290/44; 322/37
(58) Field of Classification Search ...................... 290/44
See application file for complete search history.

(56) References Cited

U.S. PATENT DOCUMENTS

| | | | |
|---|---|---|---|
| 4,656,379 A * | 4/1987 | McCarty | 310/181 |
| 5,083,039 A | 1/1992 | Richardson et al. | |
| 5,510,689 A * | 4/1996 | Lipo et al. | 318/809 |
| 5,675,094 A * | 10/1997 | Klauber et al. | 73/862.191 |
| 6,476,580 B1 * | 11/2002 | Nakamiya et al. | 318/696 |
| 6,525,504 B1 * | 2/2003 | Nygren et al. | 318/700 |
| 6,566,764 B2 | 5/2003 | Rebsdorf et al. | |
| 6,838,781 B2 | 1/2005 | van de Loo | |
| 6,853,094 B2 * | 2/2005 | Feddersen et al. | 290/44 |
| 6,856,038 B2 * | 2/2005 | Rebsdorf et al. | 290/44 |
| 6,943,537 B2 * | 9/2005 | Blakely | 324/127 |
| 7,042,109 B2 | 5/2006 | Gabrys | |
| 7,157,804 B2 * | 1/2007 | Kimura et al. | 290/52 |
| 7,215,035 B2 | 5/2007 | Hudson | |
| 7,239,036 B2 * | 7/2007 | D'Atre et al. | 290/44 |
| 7,245,037 B2 | 7/2007 | Angquist et al. | |
| 7,253,537 B2 * | 8/2007 | Weng et al. | 290/44 |
| 7,327,123 B2 * | 2/2008 | Faberman et al. | 322/37 |
| 7,391,126 B2 * | 6/2008 | Liu et al. | 290/44 |
| 7,411,309 B2 * | 8/2008 | Hudson | 290/44 |
| 7,417,334 B2 * | 8/2008 | Uchiyama | 290/55 |
| 7,462,946 B2 * | 12/2008 | Wobben | 290/44 |
| 7,518,256 B2 * | 4/2009 | Saragueta et al. | 290/44 |
| 7,531,910 B2 * | 5/2009 | Flottemesch et al. | 290/44 |
| 2006/0267560 A1 * | 11/2006 | Rajda et al. | 323/209 |
| 2007/0052244 A1 * | 3/2007 | Hudson | 290/44 |
| 2007/0132248 A1 * | 6/2007 | Weng et al. | 290/44 |
| 2007/0216164 A1 * | 9/2007 | Rivas et al. | 290/44 |
| 2009/0079193 A1 * | 3/2009 | Nielsen et al. | 290/44 |

FOREIGN PATENT DOCUMENTS

| WO | WO 2004040748 A1 * | 5/2004 |
|---|---|---|
| WO | WO 2007140466 A2 * | 12/2007 |

* cited by examiner

*Primary Examiner* — Joseph Waks
(74) *Attorney, Agent, or Firm* — Boyle Fredrickson, S.C.

(57) ABSTRACT

A wind turbine 36 has a back-to-back AC/DC/AC power electronic converter chain in which the grid side converter 48 is connected in series with DFIG stator windings 64.
The machine side converter 56 is fed from the rotor windings 54 of the DFIG 44.
Series connection of the grid side converter 48 enables voltage sag ride-through capability via control of the stator flux. In the event of a grid voltage sag, the series converter allows for a controlled response in the stator flux and electromagnetic shaft torque, protects the machine side converter and enables continued power delivery to the grid.

17 Claims, 12 Drawing Sheets

POWER CONDITIONING ARCHITECTURE FOR A WIND TURBINE

CROSS-REFERENCE TO RELATED APPLICATION

This application claims the benefit of U.S. Ser. No. 60/809,737 filed May 31, 2006, the disclosure of which is incorporated herein by reference.

BACKGROUND OF THE INVENTION

1. Field of the Invention

The preferred embodiments are directed to wind turbine generators, and more particularly, electrical architecture for such generators that facilitates operation during grid faults and low voltage events.

2. Description of the Prior Art

Worldwide capacity of wind-powered generators makes up less than 1% of world-wide electricity use. Nevertheless, although still a relatively minor source of electricity for most countries, wind power generation more than quadrupled between 1999 and 2005. For example, wind power is used in large scale wind farms to supply national electrical grids, but is also used in small individual turbines for providing electricity in isolated locations.

As the penetration of large scale wind turbines into electric power grids continues to increase, electric system operators are placing greater demands on wind turbine power plants. Specifically, wind turbine power plants must provide a specified amount of reactive power and deliver fault clearing current in the event of grid faults and the accompanying voltage sags. Low voltage ride through requirements first proposed by German electric transmission operators E.ON and VE-T in 2003, and recently adopted in the U.S. via FERC order 661 is presented in FIG. 1. In this regard, these adopted regulations address an issue with conventional wind turbine generators—voltage sags. That is, during extreme voltage sags at the point of common coupling (PCC), also referred to as "collector", high per unit currents and shaft torque pulsations occur. These transients can place stringent demands on conventional doubly fed induction generator (DFIG) based wind turbines.

Specifically, as illustrated in FIGS. 2A-2D, the onset of a voltage sag, shown as a 1.0 per unit voltage drop in FIG. 2A, can result in significant stator flux oscillations, as shown in FIG. 2B. Moreover, the voltage sag can also cause substantial oscillations in rotor phase current. These oscillations diminish as the PCC voltage remains level, but reoccur when the PCC voltage returns to its pre-sag levels, as illustrated in FIG. 2C. In addition to stator flux and rotor current oscillations, a drop in PCC voltage can place an increasing torque on the rotor, as shown in FIG. 2D, that can result in premature failure of the wind turbine.

The difficultly in surviving severe voltage sags is a direct result of the properties of the semiconductor power conversion architecture customarily found in DFIG wind turbines. Conventional DFIG wind turbines have a semiconductor AC/DC/AC conversion chain that is used to condition the power delivered from the rotor circuit for frequency and amplitude compatibility with the grid. During extreme PCC voltage sags, very high currents are induced in the rotor circuit, as illustrated in FIG. 2C, which can damage the rotor side converter and cause undue fatigue on the gearbox.

In a conventional DFIG wind turbine 10, schematically shown in FIG. 3A, a blade arrangement 12 is driven by a gearbox 14 coupled to a DFIG circuit 16 that includes a generator 18. The stator windings 20 of the generator 18 are connected to the grid PCC 22 and are excited at the grid frequency. The rotor windings 24 of the generator 18 are connected to the AC side of a DC/AC converter 26, called the machine side converter (MSC). The AC side of a second DC/AC converter 28, commonly referred to as the grid side converter (GSC), is connected in parallel with the machine stator windings 20 and PCC 22. A transformer 30 enables voltage and current compatibility between the GSC 28, stator windings 20 and the PCC 22. The DC ports of each converter 26, 28 are connected to form a DC link 32, enabling power flow between them. A capacitor 34 stabilizes the DC link voltage. Each of the three phase DC/AC converters 26, 28 is composed of a set of IGBTs and diodes in a bridge configuration. The IGBTs are switched at very high frequency to synthesize a set of three phase AC voltage waveforms.

As shown in the simplified circuit diagram of FIG. 3B, a high bandwidth PI regulator 25 is implemented to control the rotor current via the MSC 26. With proper reference alignment, one component of the rotor current is proportional to torque; the other component of rotor current supplies reactive power to the DFIG 30. Likewise, a high bandwidth PI regulator 27 on the GSC current yields control of the DC link voltage and reactive power delivered to the grid.

One benefit of this DFIG configuration 16 is that for a practical rotor speed range, the AC/DC/AC conversion path only processes a fraction of the total electrical power delivered to the grid. The bulk of the power flows directly from the stator windings 20 to the PCC 22. As a result, the losses due to the semiconductor conversion path are minimized to produce a high net efficiency. Also, the two AC/DC converters 26, 28 can be sized for a fraction of the total electrical output power, resulting in lower investment costs and less mass installed in the nacelle.

Optimum wind energy capture is typically achieved by specifying a desired torque based on the wind speed from a look-up table. At low to intermediate wind speeds, the torque profile targets the optimum tip-speed ratio for the turbine blades. At high wind speeds the torque command rises sharply to limit the rotor speed to approximately 1.2 per unit. Rotor shaft over-speed is prevented from a regulator that pitches the turbine blades to reduce the coefficient of performance.

However, as noted above, conventional DFIG configurations have difficulty in tolerating PCC voltage disturbances. Referring again briefly to FIG. 3A, one proposed solution is to use the MSC 26 to try and reduce the magnetic field in the DFIG in response to a voltage sag. This approach has not been shown to survive voltage sags below 20% of nominal PCC voltage and requires increasing the size of the MSC. In addition significant torque spikes and oscillations occur during the voltage sag event.

Referring now to FIG. 3C, one proposed solution is the use of a three phase SCR 29 and resistor crowbar circuit 31 provided in parallel with the MSC 26 which is capable of riding through a PCC voltage sag down to 15% of nominal voltage. This approach may result in a highly oscillatory current response and compromised control of shaft torque. Analysis of a similar topology found that the rotor shaft endures torque roughly 3 to 4 times rated, the stator current is largely unchanged, and consumes reactive power from the grid during the sag event. In a further proposed modification, a pulse width modulated IGBT bridge for the SCRs in the rotor crowbar circuit has been suggested to improve voltage sag response.

Referring now to FIG. 3D, a DFIG system with three pairs of anti-parallel SCRs 33 in series with the stator connection to the grid, in addition to SCRs 29 and resistor crowbar 31 in parallel with the MSC, has also been suggested. At the inception of the voltage sag, the stator series SCRs 33 disconnect the DFIG stator terminals from the grid, while the GSC remains connected to service the grid fault current, up to its limit. The stator terminals are reconnected after the MSC demagnetizes the DFIG and resynchronizes it to the new PCC voltage, typically within 20 ms. This approach is believed to produce peak stator current and shaft torque of less than 2 per unit during sag events. Moreover, the rotor crowbar 11 remains for emergency backup protection. One of the drawbacks of this approach is that it does not provide ride-through during the voltage disturbance (i.e., the machine disconnects and does not serve the grid) and therefore does not comply with the ride-through standards.

In summary, modifications to the conventional DFIG architecture for ride-through have been proposed that include, for example, using the MSC to control the magnetic field in the DFIG, the use of a clamping circuit connected to the rotor and stator side semiconductor switches to enable brief disconnection and reconnection of the wind turbine upon inception of the sag event. However, such conventional modifications to the doubly fed induction generation (DFIG) architecture for low voltage ride-through result in limited control of the turbine shaft and grid current during fault events, thus leaving the system highly susceptible to being catastrophically damaged. A new electrical architecture for DFIG wind turbines with improved low voltage ride-through is needed.

SUMMARY OF THE INVENTION

The preferred embodiments are directed to an improved doubly fed induction generation (DFIG) architecture which provides continued control of the wind turbine DFIG electromagnetic torque and current during a grid fault or voltage disturbance, (e.g., a voltage sag) and reduces the size of the transient currents and torque levels during these events. The stator windings are able to maintain connection to the grid during the fault and continue to supply current to the grid throughout the fault event.

According to one aspect of a preferred embodiment, a power conditioning system for a wind turbine connected to a power grid at a point of common coupling, for example, a collector includes an input connected to the stator windings of the wind turbine. A power switching network is connected to the input and scales magnetic flux in the stator windings in response to voltage disturbances at the collector.

In accordance with another aspect of this embodiment, the power switching network includes a machine side converter (MSC) and a grid side converter (GSC). The GSC is connected in series with both the stator windings and the collector.

In another aspect of this embodiment, a second grid side converter is connected in parallel with the collector so as to meet power flow requirements.

In another aspect of this embodiment, the second grid side converter includes a rectifier bridge.

According to an aspect of another preferred embodiment, a doubly fed induction generator (DFIG) based wind power generator includes stator windings and a grid side converter (GSC). The GSC is connected in series with the stator windings so as to facilitate continuous power delivery during a fault condition.

According to an aspect of another preferred embodiment, a method of conditioning power supplied by a doubly fed induction generator (DFIG) used in a wind turbine includes providing a DFIG having a grid side converter and stator windings that produce stator flux. Preferably, the stator flux is controlled so as to facilitate continuous power delivery during a fault condition, such as a voltage disturbance.

In sum, ride-throughs in response to voltage disturbances are accomplished by buffering the system between a collector (e.g., point of common coupling) and the stator windings. Four primary connection configurations are described including a) connecting a series grid side converter (SGSC) to the stator windings at a Y point, b) connecting the SGSC to the machine side converter via a DC link (injection transformer included), or, in two alternatives, employing a second grid side converter by either c) connecting the SGSC to a Y point and including a parallel grid side rectifier, or d) connecting the SGSC to a Y point and employing a second grid side converter comprising a set of IGBTs and diodes, described further below.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
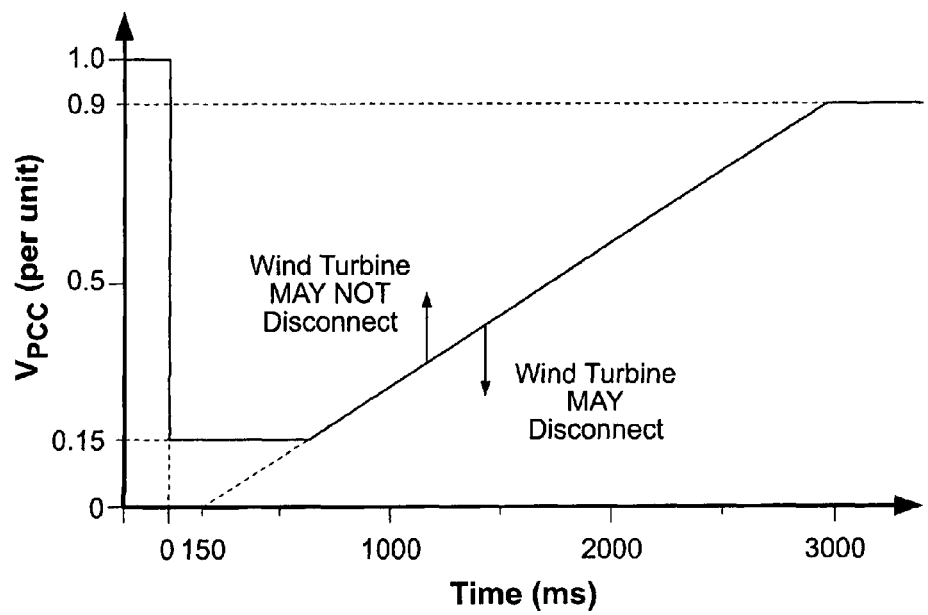
FIG. 1 is a graph illustrating low voltage ride through requirements for large scale wind turbines.
Figure 2A:
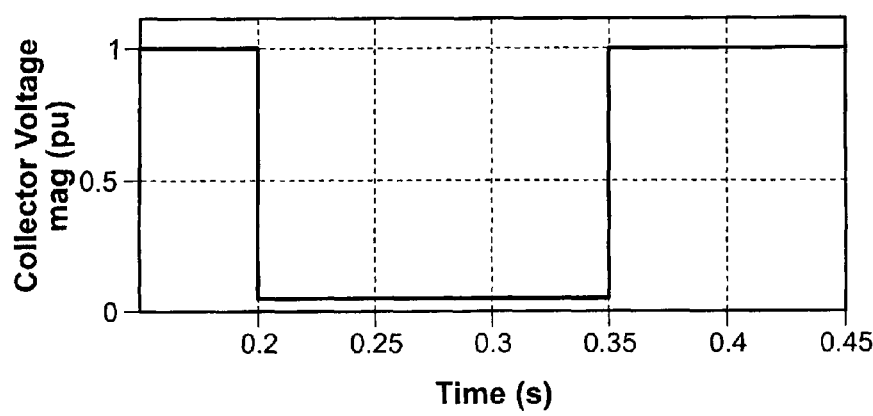
FIG. 2A is a chart showing a PCC voltage sag event.
Figure 2B:
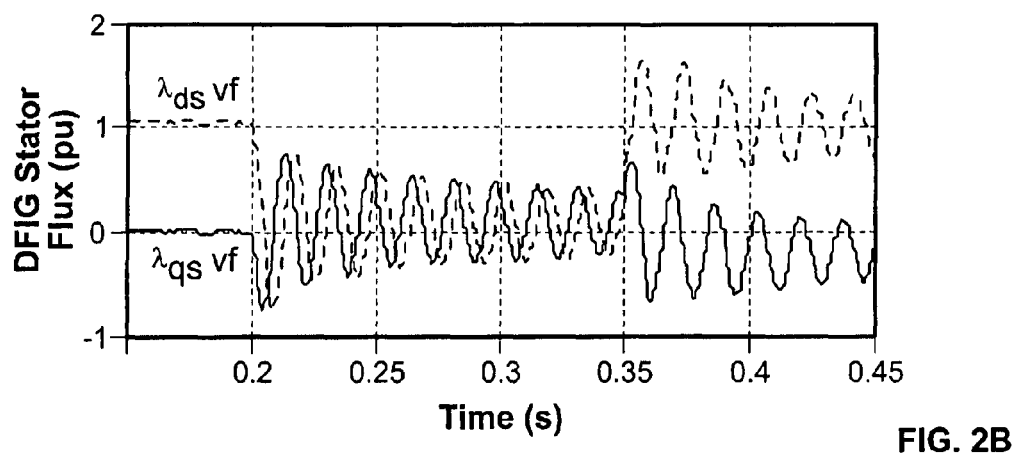
FIG. 2B is a chart showing DFIG stator flux response to the PCC voltage sag event.
Figure 2C:
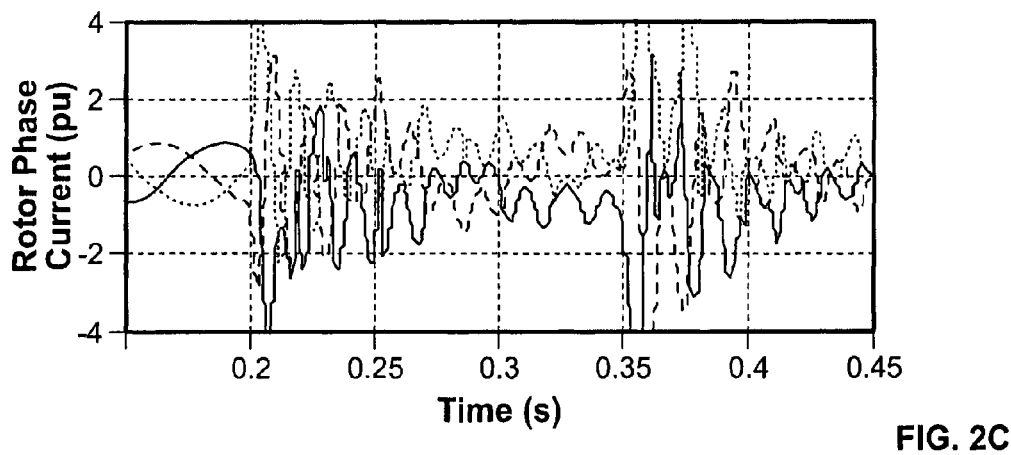
FIG. 2C is a chart showing rotor phase current response to the PCC voltage sag event.
Figure 2D:
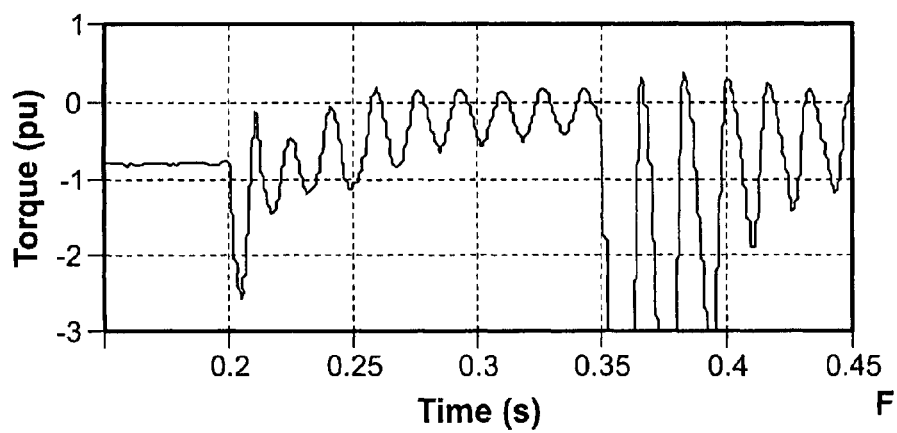
FIG. 2D is a chart showing the torque created in a generator of a conventional DFIG-based wind turbine in response to the PCC voltage sag event.
Figure 3A:
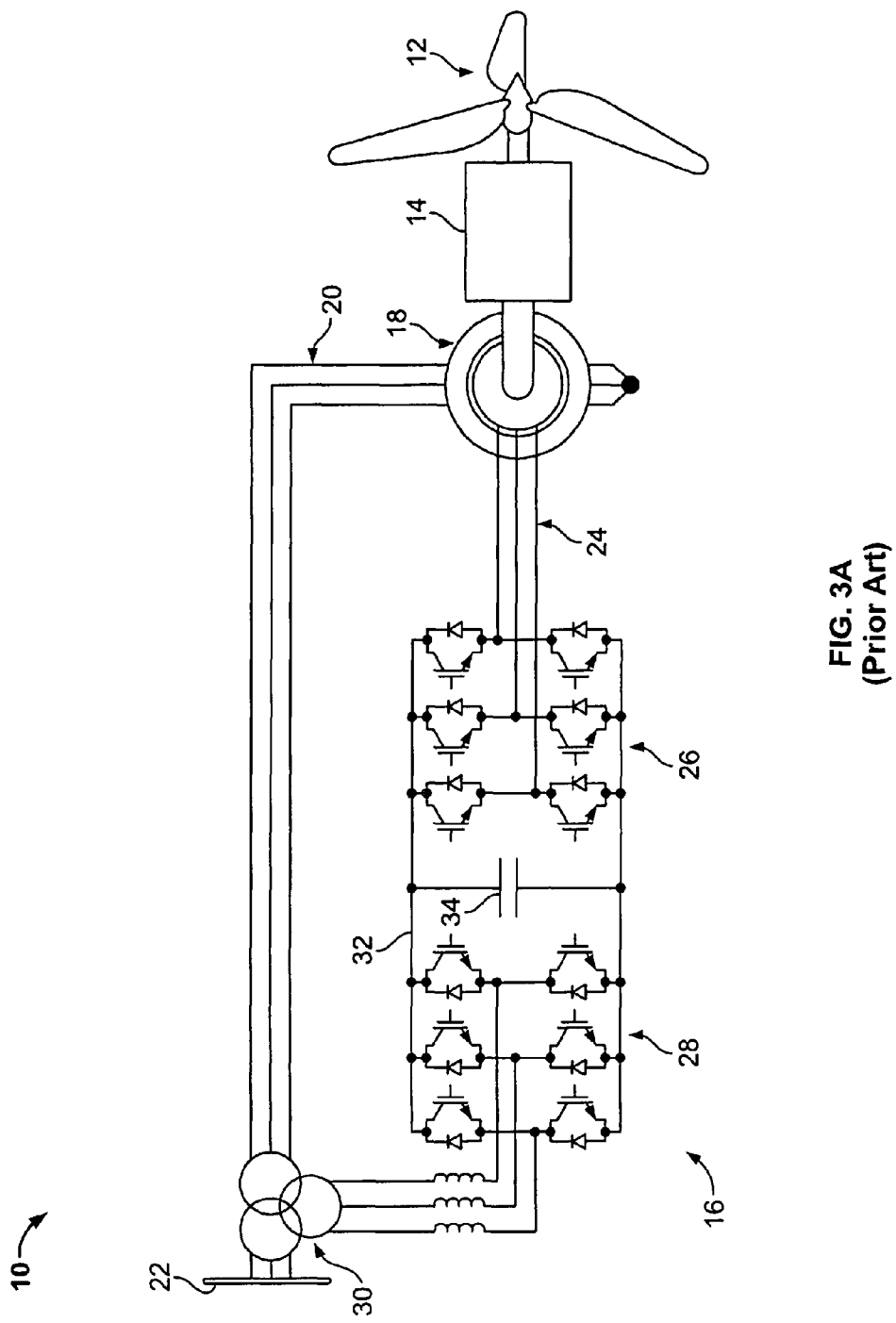
FIG. 3A is a schematic diagram of a prior art conventional doubly fed induction generation (DFIG) wind turbine architecture.
Figure 3B:
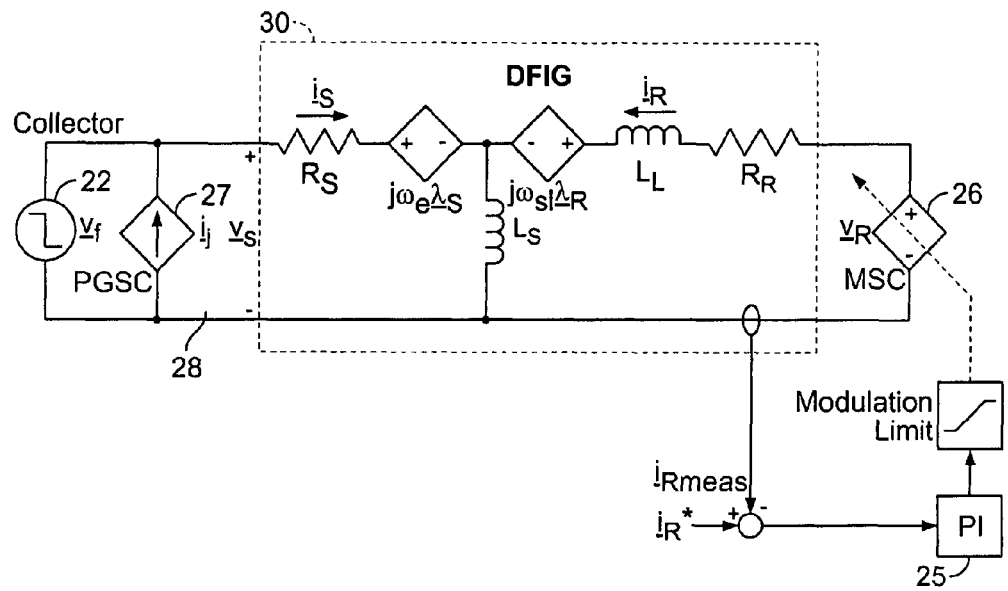
FIG. 3B is a simplified schematic diagram of the DFIG wind turbine architecture shown in FIG. 3A.
Figure 4A:
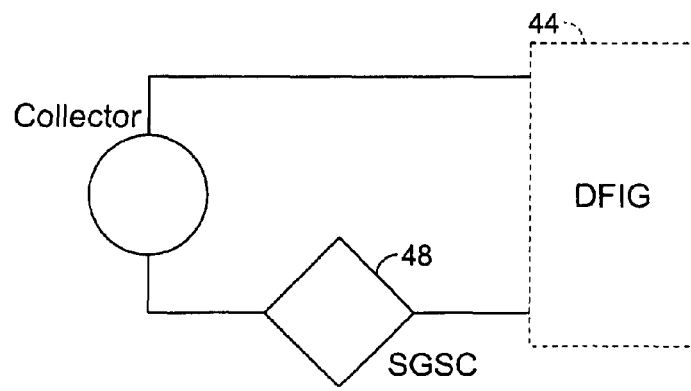
FIG. 4A is a simplified diagram of a stator side of a DFIG wind turbine architecture according to one preferred embodiment.
Figure 3C:
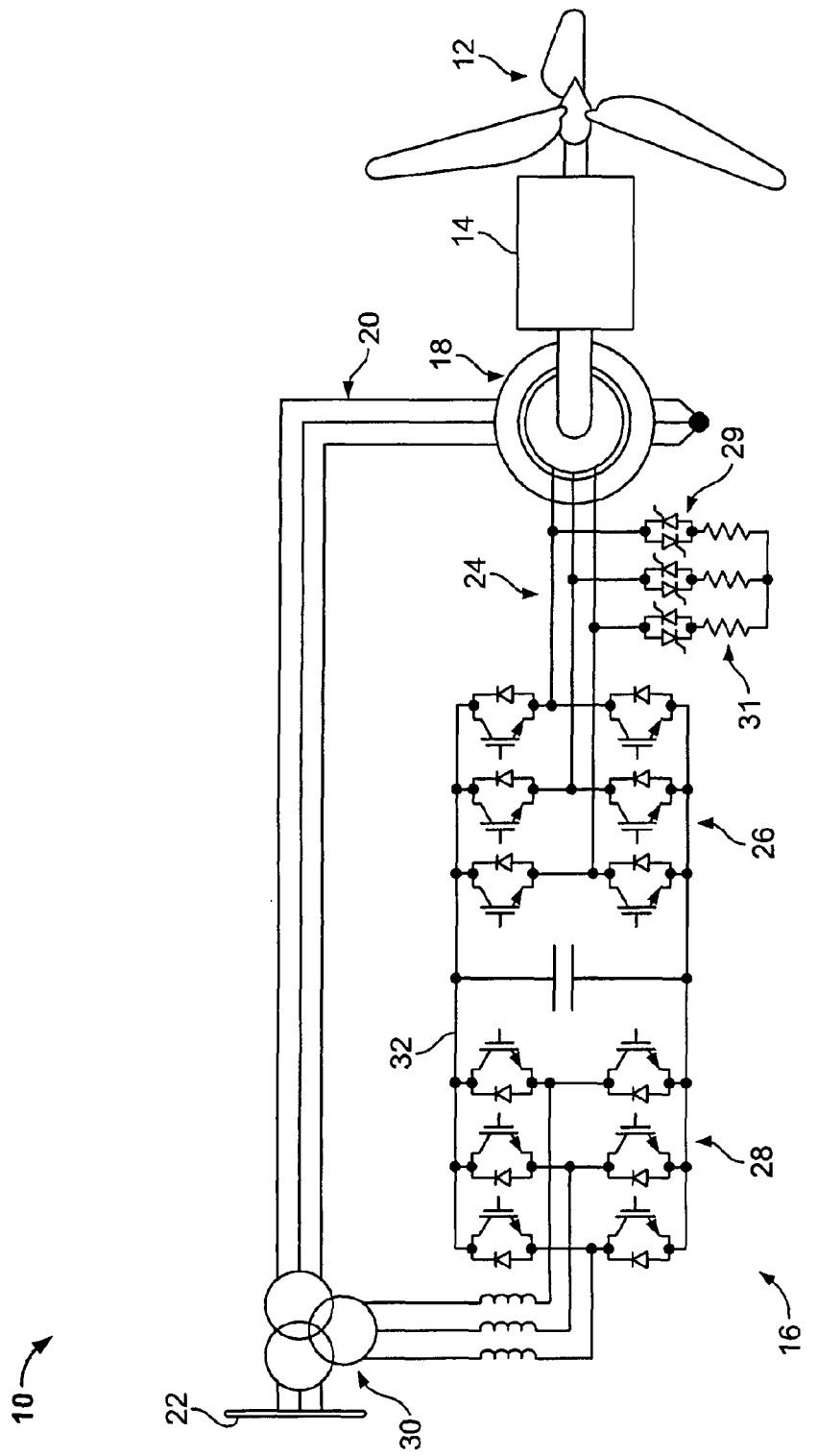
FIG. 3C is a schematic diagram showing one known proposed modification to a conventional DFIG wind turbine architecture.
Figure 3D:
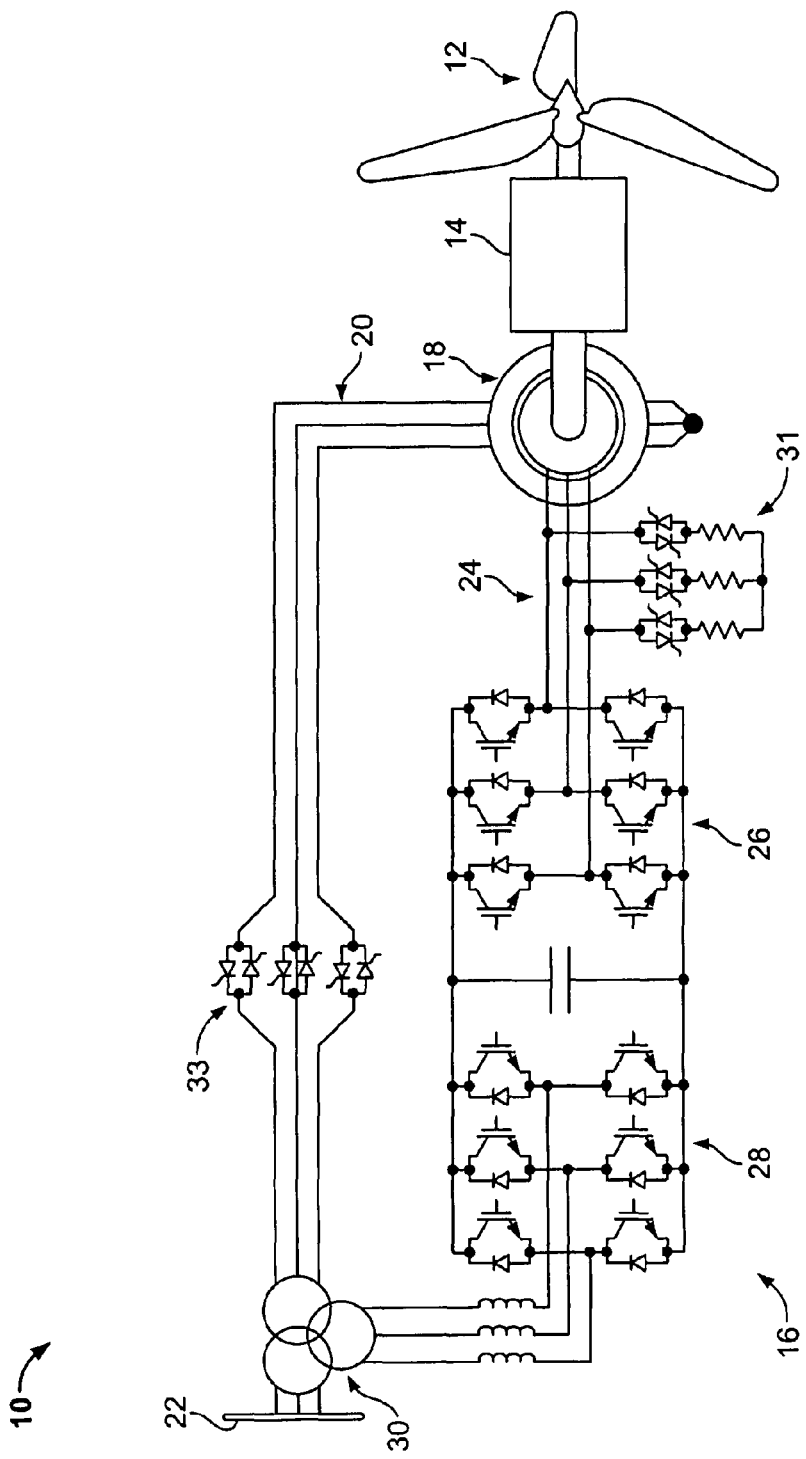
FIG. 3D is a schematic diagram showing one known proposed modification to a conventional DFIG wind turbine architecture.

FIG. 4A schematically shows a stator-side architecture for a DFIG-based wind turbine according to one embodiment of the present disclosure. As illustrated, a SGSC (series grid side converter) behaves as a buffer between a collector, e.g., PCC (point of common coupling), and a DFIG (doubly fed induction generator) thereby decoupling interactions between the PCC and the DFIG. As will be explained in greater detail below, the SGSC is effective in reducing stator flux in the DFIG during voltage disturbances, such as voltage sags, in the PCC.

Figure 4B:
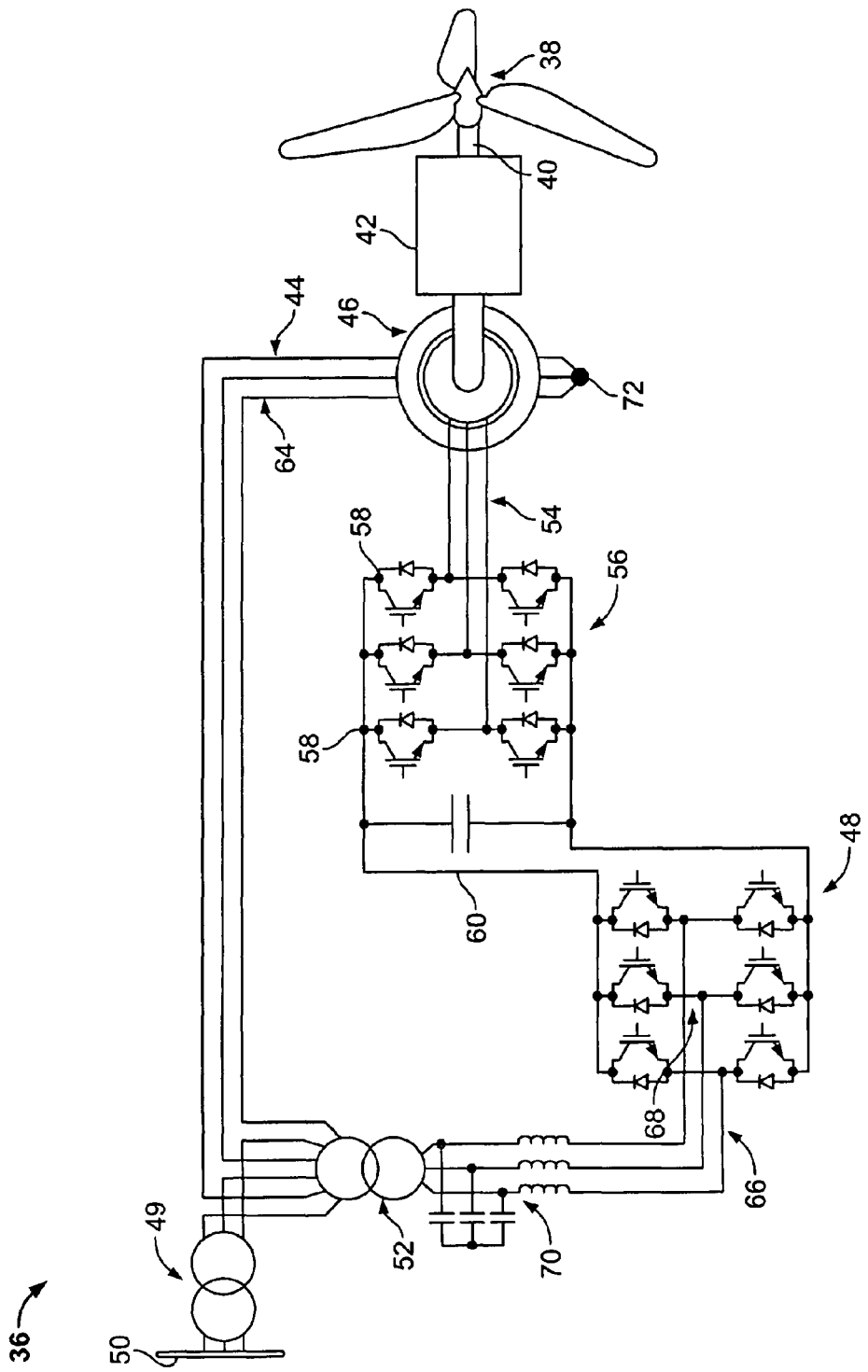
FIG. 4B is a schematic diagram of a DFIG wind turbine architecture according to one preferred embodiment incorporating the stator side architecture shown in FIG. 4A.

FIG. 4B illustrates a wind turbine 36, according to one embodiment of the present disclosure that incorporates a buffer such as that described with respect to FIG. 4A. The wind turbine 36 includes a blade arrangement 38 connected to a rotor 40 that is driven in a computer controlled manner by a gearbox 42. The gearbox 42 is connected to a DFIG circuit 44 through a generator 46. The DFIG circuit 44 has a series grid side converter (SGSC) 48 connected between transformer 49 at the point of common coupling (PCC) 50 and main stator windings 64 via a three-phase injection transformer 52. Rotor windings 54 are connected to the AC side of a DC/AC converter 56, commonly referred to as a machine side converter (MSC). The dc terminals 58 of the MSC 56 are connected to the SGSC 48 through a dc link 60. The primary windings 62 of three-phase injection transformer 52 are connected in series with main stator windings 64 and the secondary windings 66 of transformer 52 are connected to the AC terminals 68 of SGSC 48. An inductor-capacitor filter 70 is connected between the SGSC 48 and the transformer 52 to limit switching frequency losses of the transformer 52. As also shown in FIG. 4B, the stator windings 64 are closed at Y point 72.

Figure 4C:
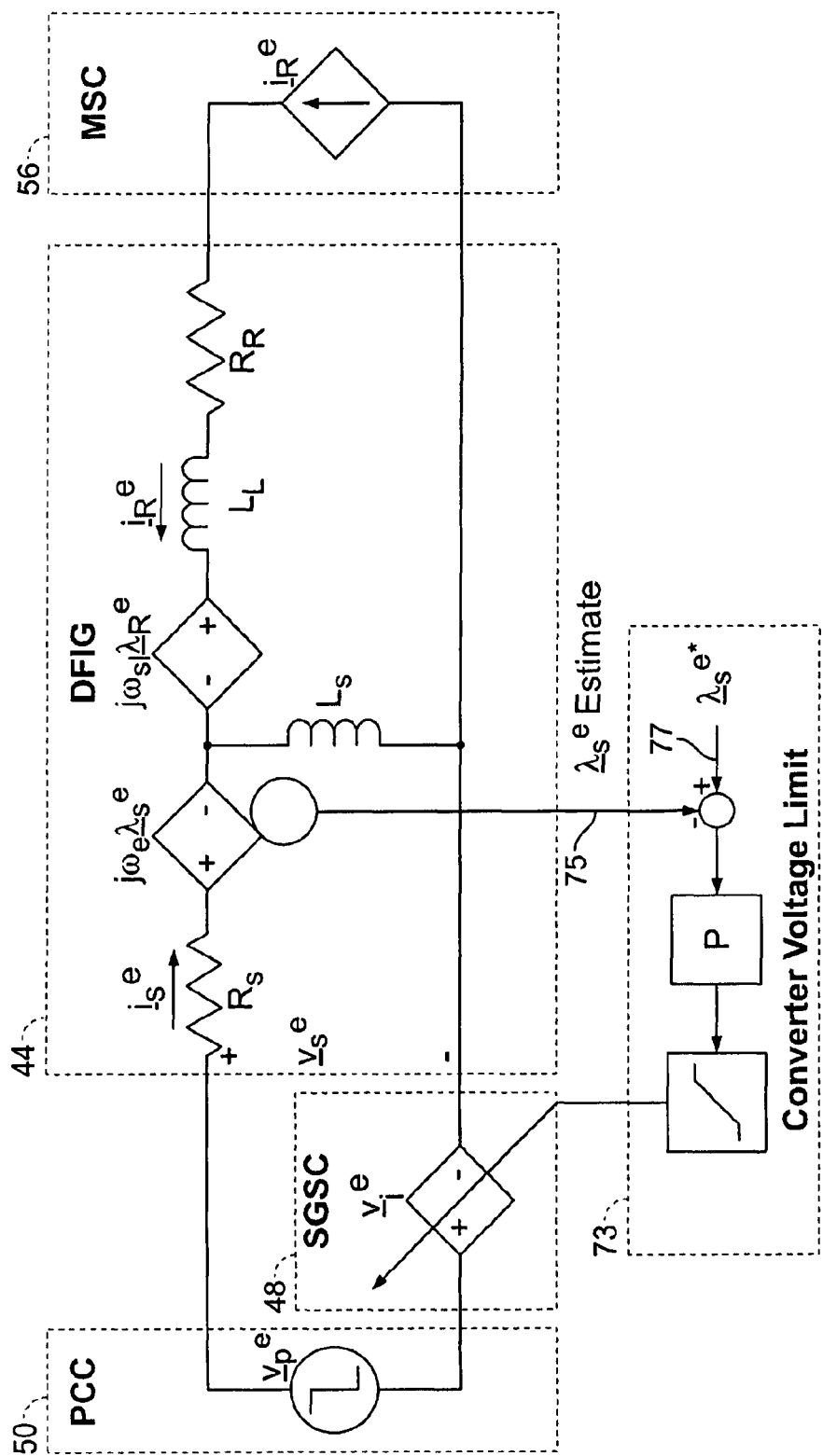
FIG. 4C is a simplified diagram of the DFIG wind turbine architecture shown in FIG. 4B.

Referring now to FIG. 4C, control of the series grid side converter voltage, $v_i^e$, added to the PCC voltage, is realized through the regulation of the stator flux. The rotor current regulator acting on the MSC 56 and the coupling between MSC 56 and SGSC 48 via the DC link 60 is not explicitly shown in the figure for the sake of simplicity. The proportional regulator 73 is driven by the error between the estimated stator flux 75 and a stator flux command 77. State feedback decoupling of PCC voltage, rotor current and stator flux reduce the dynamic and steady state regulation error. The stator flux command reference 77 is generated as part of external control loops regulating the DC link voltage and total flux magnitude, as further described herein. The stator flux command 77 is scaled in proportion to the PCC voltage magnitude enabling a smooth transition of the stator flux in the event of PCC voltage sag.

Figure 4D:
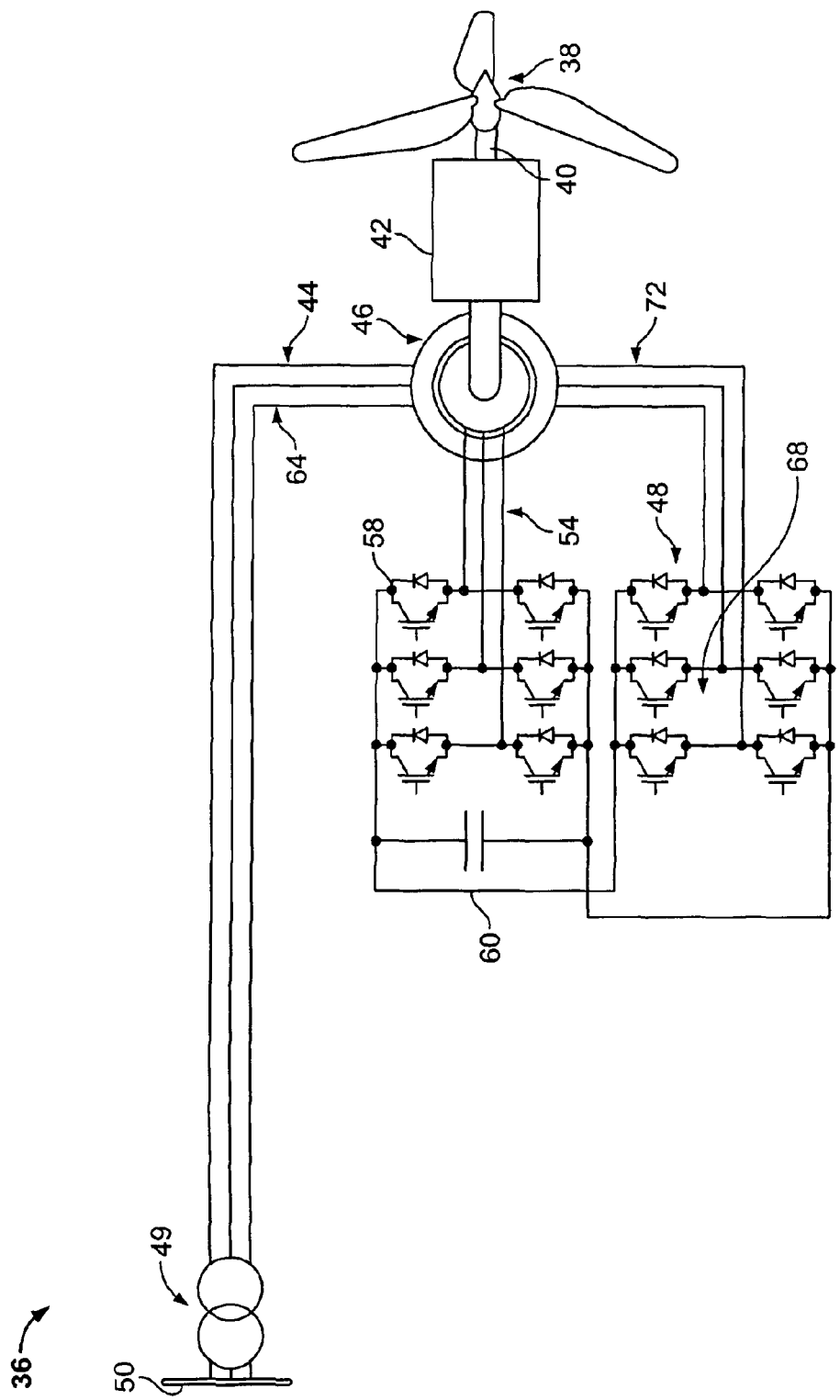
FIG. 4D is a schematic diagram of a DFIG wind turbine architecture similar to that shown in FIG. 4B with a series grid side converter connected to the Y point of the stator windings according to another embodiment of the invention.

FIG. 4D shows an alternate connection of the SGSC 48. In this embodiment, the SGSC 48 is connected to the stator windings 64 at Y point 72. Thus, in contrast to the configuration shown in FIG. 4B, the stator windings 64 at Y point 72 are open rather than closed. By connecting the SGSC 48 to the stator windings 64 at Y point 72, the injection transformer, shown in FIG. 4B, is not required.

While the configurations shown in FIGS. 4A-4D are believed to provide improved PCC voltage sag ride through as compared to conventional DFIG configurations, the inventors found that incorporation of the series GSC may not meet power flow requirements during subsynchronous operation. Accordingly, in a further embodiment of the present, a unified DFIG architecture employs both series and parallel GSCs.

Figure 5:
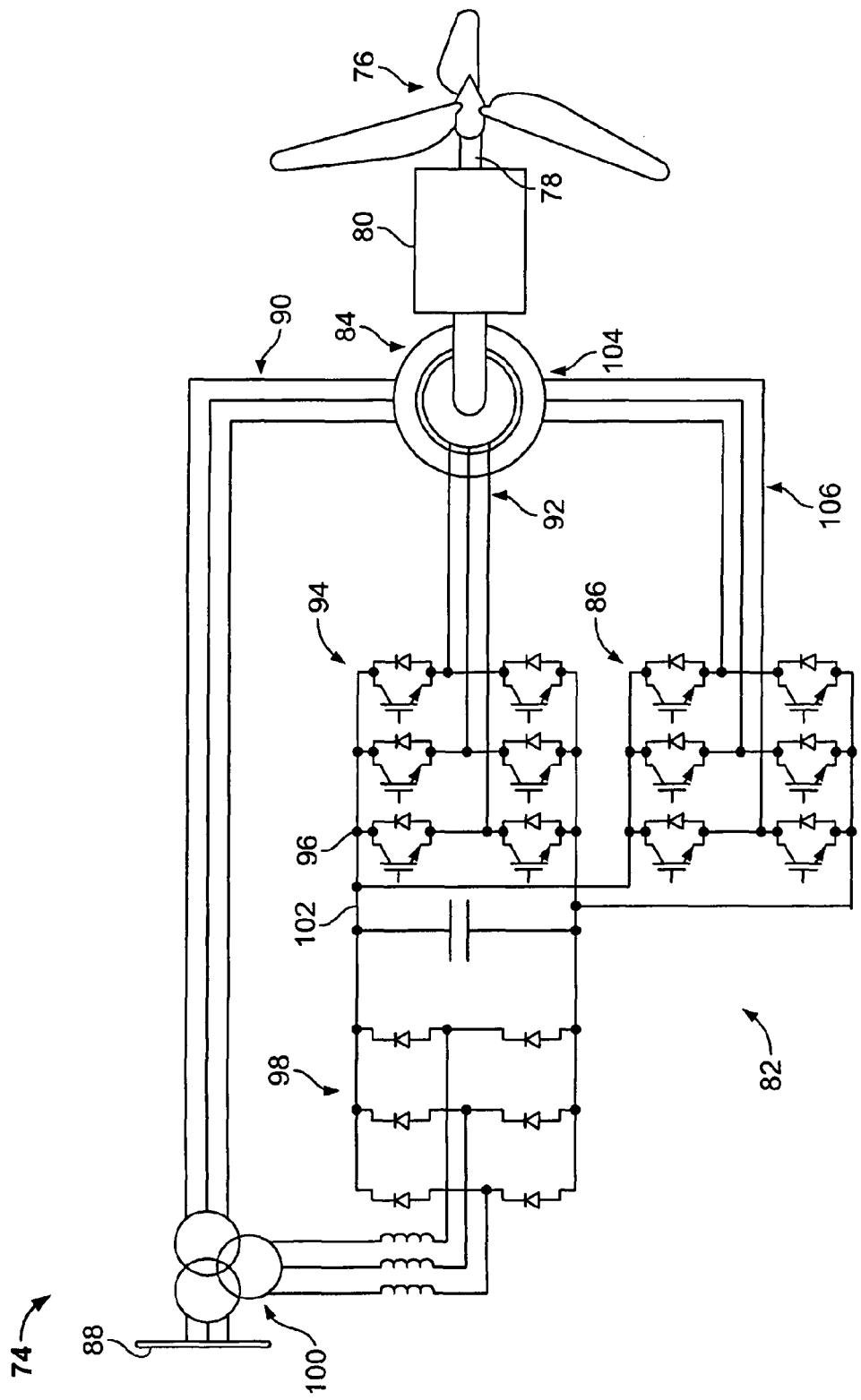
FIG. 5 is a schematic diagram of a DFIG wind turbine architecture having parallel grid side rectifier (PGSR)

Referring now to FIG. 5, wind turbine 74 includes a blade arrangement 76 connected to a rotor 78 that is driven in a computer controlled manner by a gearbox 80. The gearbox 80 is connected to a DFIG circuit 82 through a generator 84. The DFIG circuit 82 includes a SGSC 86 connected to a point of common coupling (PCC) 88. The stator windings 90 are connected to the PCC 88 by an interface transformer 100. Rotor windings 92 are connected to MSC 94. The dc terminals 96 of the MSC 94 are connected to a full bridge rectifier 98 operative as a parallel grid side rectifier (PGSR) which is excited from the line via transformer 100. The dc terminals 96 are also connected, via a dc link 102, to the SGSC 86. The three-phase terminals of the SGSC 86 are connected in series with the stator windings 90 and the PCC 88. Also, the Y point 104 of the stator windings 90 is opened and the three stator return terminals 106 are individually connected to respective legs of the SGSC 86.

One skilled in the art will appreciate that power flows into the GSC from the PCC during subsynchronous operation. Thus, if a parallel GSC is only used for power processing during subsynchronous operation then it can be realized as a diode bridge rectifier (without IGBTs), i.e., parallel grid side rectifier (PGSR) as illustrated in FIG. 5. Because the SGSC may not be optimal for power processing in the subsynchronous operating region, the PGSR must provide all of the DC link power during subsynchronous operation.

However, the PGSR may be unable to extract power from the DC link. Therefore, the SGSC must extract all of the power from the DC link during supersynchronous operation. Furthermore, the SGSC can also be used to set the DFIG stator flux level for optimum overall efficiency. The SGSC is sized to meet the maximum supersynchronous power processing requirements and to enable ride through of the worst PCC voltage sag.

Figure 6:
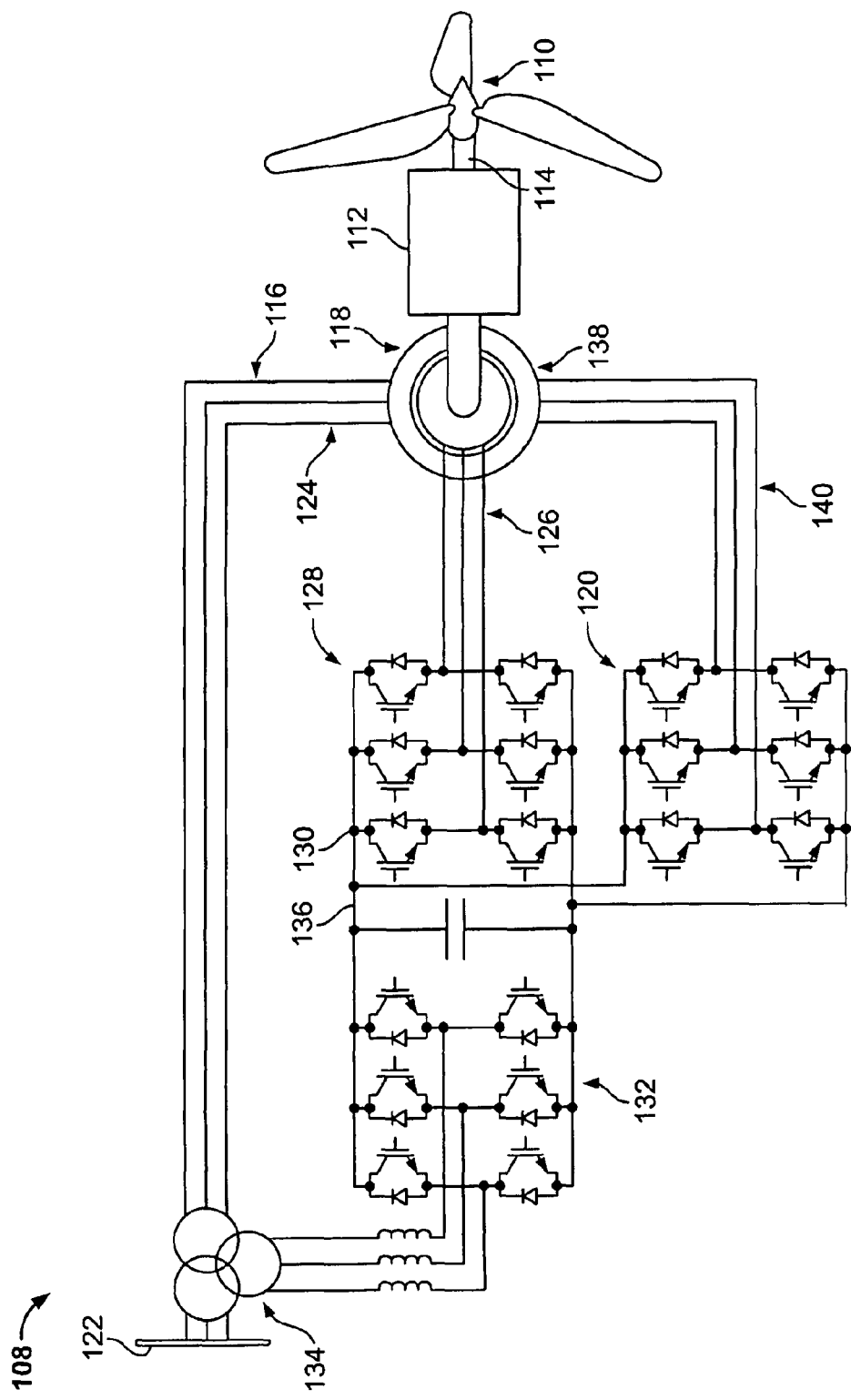
FIG. 6 is a schematic diagram of a DFIG wind turbine architecture employing both series and parallel grid side converters.

Rather than a diode bridge rectifier, a parallel grid side converter (PGSC) consisting of IGBTs (or similar components) and diodes (or similar components), such as illustrated in FIG. 6 may be used. For instance, and referring to FIG. 6, wind turbine 108, similar to the embodiments described herein, has a blade arrangement 110 connected to a computer controlled gearbox 112 through a rotor 114. The gearbox 112 is connected to a DFIG circuit 116 through a generator 118, wherein the DFIG circuit 116 has a series grid side converter (SGSC) 120 connected to a point of common coupling (PCC) 122. Stator windings 124 are connected to the PCC 122 whereas rotor windings 126 are connected to MSC 128. The dc terminals 130 of the MSC 128 are connected to a PGSC 132 which is excited from the line via transformer 134. The dc terminals 130 are also connected, via a dc link 136, to the SGSC 120. The three-phase terminals of the SGSC 120 are connected in series with the stator windings 116 and the PCC 122. Also, the Y point 138 of the stator windings 124 are opened and the three stator return terminals 140 are individually connected to respective legs of the SGSC 120.

The PGSC 132 is a bidirectional active power converter. Since the SGSC 120 may not be optimal for power processing in the subsynchronous operating region, wind turbine 108 utilizes the PGSC 132 to provide the DC link power during subsynchronous operation. During supersynchronous operating region, the PGSC 132 and SGSC 120 are coordinated to deliver power from the DC link 136 and set the DFIG stator flux level for optimum overall efficiency. The power processing capabilities of the SGSC 120 and PGSC 132 operating together handles the total maximum power to be processed from the DC link 136.

Figure 7:
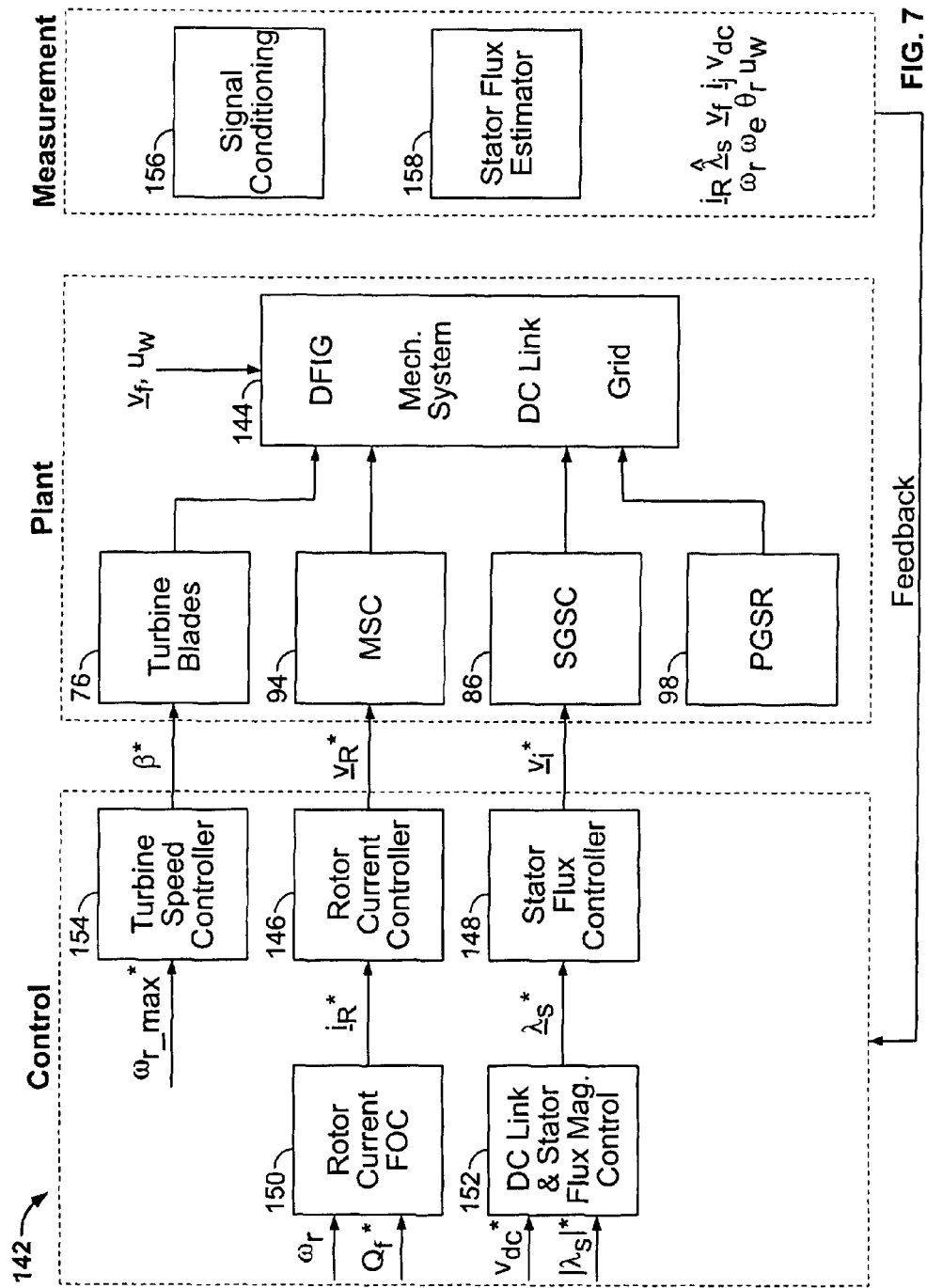
FIG. 7 is a high level control block diagram for the unified DFIG architecture shown in FIG. 5.

A hierarchal block diagram of a system controller 142 is presented in FIG. 7. The system controller will be described for a wind turbine wherein a PGSR is used as a PGSC such as illustrated in FIG. 5. Control objectives for the DFIG wind turbine architecture include regulation of the rotor speed, electrical power production (via torque), reactive power at the point of common coupling, stator flux magnitude and the dc link voltage, generally represented at block 144. Inner control loops on the MSC and SGSC represented by blocks 146 and 148, respectively, regulate the rotor current and stator flux, respectively. MSC current commands are generated from field oriented torque control and collector reactive power control loops represented by block 150. Commands for the SGSC stator flux controller are generated from outer loop controllers for the dc link voltage and the stator flux magnitude represented by block 152. These two outer loops 150, 152 feeding the flux command are designed to accommodate the handoff of power processing responsibilities between the PGSR 98 and SGSC 86 between be sub- and super-synchronous operation. Turbine rotor speed is regulated via blade pitch actuators represented by block 154 to reduce the coefficient of performance and throttle mechanical torque production. In addition to other feedback signals, measurement or estimation of the collector voltage, stator flux and stator current, represented by blocks 156 and 158, respectively, enables dynamic response and ride through of voltage sags.

As noted above, the turbine rotor speed is controlled by throttling the mechanical torque through pitching of the turbine blades 76. The command rotor speed is set to the maximum. The rotor speed error drives a PI regulator (not shown) to command the appropriate pitch angle. Saturation blocks (not shown) prevent blade pitch actuation unless the rotor speed error is positive.

Control of the rotor current is achieved via a high bandwidth stator flux aligned proportional controller 146 which generates switching command signals for the MSC 94. Estimates of machine parameters, measurements of rotor current, stator and dc link voltage, rotor and slip speeds, and an estimate of the stator flux at blocks 156, 158 are further used to improve steady state and dynamic tracking accuracy and disturbance rejection.

Electromagnetic torque is controllable via the component of the rotor current orthogonal to the stator flux. The torque-speed command profile follows the optimum tip-speed-ratio at low and medium rotor speeds. The reactive power at the collector node is controlled by the component of the rotor current that is collinear with the stator flux. The reactive power can be controlled to zero.

The stator flux controller 148 transforms the oscillatory stator flux response during faults into a well behaved and bounded exponential dynamic response. In a preferred embodiment, the stator flux controller 148 is a stator current aligned synchronous frame proportional loop to generate the switching command signals for the SGSC 86. Estimates of machine parameters, measurements of rotor current, PCC and dc link voltage, excitation frequency, and an estimate of stator flux are further used to improve tracking accuracy and disturbance rejection. The stator flux in the stationary reference frame (superscript "s") can be estimated from the stator voltage and current and an estimate of the stator resistance as $$\lambda_s^s = \int (v_s^s - \hat{R}_s i_s^s) dt. \qquad \text{Eqn. 1}$$

During supersynchronous operation, the SGSC 86 is used to transfer power from the DC link 102 to the AC grid, thereby maintaining control of the DC link voltage. If the PGSR 98 is inactive (i.e. the DC link voltage is regulated such that the PGSR diodes do not conduct) the DC link voltage state equation can be expressed in terms of the stator flux as $$\frac{dv_{dc}}{dt} = \frac{-3}{2C_{dc}v_{dc}}[|i_s|(\omega_e \lambda_{ds}^{is} - v_{qf}^{is} + |i_s|R_s) \ldots - (\omega_{sl}|\lambda_s|i_{dR}^{\lambda s} - |i_R|^2 R_R)] \qquad \text{Eqn. 2}$$

The DC link voltage can be controlled by changing the angle of the stator flux with respect to the stator current via the $\lambda_{ds}^{is}$ term (or equivalently $-\sin(\theta_{\lambda_s} - \theta_{is})$) without affecting the torque producing variables, namely $|\lambda_s|$ and $i_{dR}^{\lambda_s}$.

The power from the SGSC 86 is proportional to the q-component of the SGSC voltage (and inversely, the q-component of the stator voltage) in the stator current reference frame. Due to the relationship between the stator voltage and stator flux ($\lambda_s \cong -jv_s/\omega_e$) the q-component of the SGSC voltage corresponds to the d-component of the stator flux.

In a preferred embodiment, feedback or exact linearization is used for control design because of the wide variation in the product terms, such as stator current, over the nominal operating range. Feedback linearization transforms the nonlinear relationship between the controllable input, $1_{ds}^{is}$, and the output to the system, $v_{dc}$, into a one in which the dynamic relationship between the error, $v_{dc} - v_{dc}^*$, and new input, $\zeta$, is linear and exhibits a first order response.

Application of the feedback linearization process yields the following relationship for the commanded d-component of the stator flux:

$$\lambda_{ds}^{is*} = \frac{-1}{|i_s|\omega_e} \left[ \frac{2\hat{C}_{dc}v_{dc}\sigma_{vdc}(v_{dc}^* - v_{dc})}{3} - v_{qf}^{is}|i_s| \ldots - \omega_{sl}|\hat{\lambda}_s|i_{dR}^{\lambda s} + |i_R|^2 \hat{R}_R + |i_s|^2 \hat{R}_s \right]. \qquad \text{Eqn. 3}$$

The controller gain, $\pi_{vdc}$, is chosen to be $2\pi 20$ rad/s.

In order to prevent the SGSC 86 from controlling the DC link 102 during subsynchronous operation (and consequently over-fluxing the DFIG circuit), a saturation block (not shown) limits the d-component of the stator flux command to $$|\lambda_{ds}^{is*}|_{max} = \left| \frac{v_f - \hat{R}_s i_s}{j\omega_e} \right|, \qquad \text{Eqn. 4}$$

as would occur at s=0. The stator flux magnitude may be set (within a restricted range) independently from the regulation of the DC link voltage. As such, the stator flux command scales directly with the collector voltage, $$|\lambda_s|^* = \left| \frac{v_f - \hat{R}_s i_s}{j\omega_e} \right|. \qquad \text{Eqn. 5}$$

In this manner the SGSC stator flux controller will naturally scale the flux command with the collector voltage. The q-component of the stator flux command is then found from the geometric relationship $$\lambda_{qs}^{is*} = \sqrt{|\underline{\lambda}_s|^{*2} - |\underline{\lambda}_{ds}^{is*}|^2}. \qquad \text{Eqn. 6}$$

Since the limit for d-component stator flux command and the stator magnitude command are equal, the q-component of stator flux will approach zero at synchronous speed.

The present invention has been described with respect to a DFIG-based wind turbine utilizing a buffer circuit to control the magnetic flux in the generator in response to voltage disturbances at the collector. The buffer circuit effectively behaves as a shock absorber for the generator during such voltage disturbances. In this regard, during normal voltage conditions, the buffer circuit may be dormant or idle. When a voltage disturbance, such as a voltage sag, does occur, the buffer engages and reduces the impact of that voltage disturbance in the generator by controlling the stator flux. As noted above, the stator flux is controlled so as to follow the voltage disturbance. Once the stator flux has been controlled, the buffer circuit disengages and returns to its dormant state.

In one preferred embodiment, the buffer circuit includes a series grid side converter in addition to a machine side converter. In another preferred embodiment, the buffer circuit includes a parallel grid side converter, such as a rectifier bridge, together with the series grid side converter. This latter embodiment is believed to be particularly robust at handling voltage sags as well as sub and supersynchronous operation conditions. In another embodiment, the parallel grid side converter consists of IGBTs (or similar components) and diodes (or similar components) rather than a rectifier bridge. In each of the aforementioned embodiments, the series grid side converter may be connected directly to the stator windings or may be connected to the Y point of the stator windings without the need for the injection transformer to enable ride-through during voltage disturbances.

That is, FIGS. 4B and 4D show two exemplary types of connections for the series grid side converter. FIGS. 5 and 6 show two exemplary configurations for a DFIG configuration having a series grid side converter and a parallel grid side converter. It is recognized that the either of the connections for the series grid side converter shown in FIGS. 4B and 4D may be used in the circuits shown in FIGS. 5 and 6. Each of these embodiments is believed to provide improved response of a wind turbine to voltage disturbances, e.g., voltage sags, and, in particular, scale the magnetic flux in the stator windings of the generator. In addition, the present invention is believed to be effective in reducing rotor phase currents and torque in the generator during voltage sag events.

Additionally, while various embodiments of the invention have been described with respect to a wind turbine have three blades, it is contemplated that the present invention is applicable with wind turbines having other blade configurations.

Also, it is recognized that other circuit configurations different from those described herein may be used to provide improved ride-through performance during voltage disturbances, and that these other configurations, while not described herein, are believed to be within the scope of the appending claims. Moreover, while the preferred embodiments have been described with respect to voltage sags, it is understood that the present invention is also applicable for controlling stator flux in response to other voltage disturbances, such as voltage swells.

Although the best mode contemplated by the inventors of carrying out the present invention is disclosed above, practice of the present invention is not limited thereto. For example, alternate electrical switching networks may be inserted in the series path of an electrical utility grid and a stator circuit of a DFIG in which the network acts as a buffer to regulate the stator flux. The system would maintain the turbine torque and stator currents at appropriately controlled levels during voltage disturbances which may occur at the electric utility terminals. In this regard, and as described herein, although an AC-DC converter that interfaces to the DC link of the rotor power network is an example of the electrical switching network, the network may consist of phase controlled switches such as SCRs and a combination of resistors, inductors and capacitors, along with appropriate controls as understood in the art. It will be manifest that various additions, modifications and rearrangements of the features of the present invention may be made without deviating from the spirit and scope of the underlying inventive concept.

We claim:

1. A power conditioning system for a wind turbine having stator windings and a collector connected to a power grid, the system comprising:
    an input connected to the stator windings; and
    a power switching network connected to the input and configured to directly scale magnetic flux in the stator windings in response to a voltage disturbance at the collector.

2. The system of claim 1 wherein the voltage disturbance is a voltage sag.

3. The system of claim 1 wherein the flux is scaled to substantially follow the voltage disturbance.

4. The system of claim 1 wherein the power switching network includes:
    a machine side converter (MSC);
    a grid side converter (GSC); and
    wherein the GSC is connected in series with both the stator windings and the collector.

5. The system of claim 4 wherein the MSC is electrically connected to the GSC by a dc link.

6. A power conditioning system for a wind turbine having stator windings and a collector connected to a power grid, the system comprising:
    an input connected to the stator windings;
    a power switching network connected to the input and configured to scale magnetic flux in the stator windings in response to a voltage disturbance at the collector, wherein the power switching network includes a machine side converter (MSC), a grid side converter (GSC), and wherein the GSC is connected in series with both the stator windings and the collector; and
    a second grid side converter connected in parallel with the stator windings and the collector.

7. The system of claim 6 wherein the second grid side converter includes a rectifier bridge.

8. The system of claim 6 wherein the second grid side converter includes a set of IGBTs and diodes.

9. The system of claim 6 further comprising an injection transformer connected to the collector and the second grid side converter.

10. A power conditioning system for a wind turbine having stator windings and a collector connected to a power grid, the system comprising:
    an input connected to the stator windings;
    a power switching network connected to the input and configured to scale magnetic flux in the stator windings in response to a voltage disturbance at the collector, wherein the power switching network includes a machine side converter (MSC), a grid side converter (GSC), and wherein the GSC is connected in series with both the stator windings and the collector; and wherein the GSC has three sets of IGBTs and diode, and wherein each set is directly connected to a stator winding of the wind turbine.

11. A DFIG-based wind power generator comprising:
stator windings;
a grid side converter (GSC);
wherein the GSC is connected in series with the stator windings so as to facilitate continuous power delivery during a fault condition; and
a second grid side converter connected in parallel with the stator windings so as to meet power flow requirements during subsynchronous operation.

12. The generator of claim 11 further comprising a machine side converter (MSC) electrically connected to the GSC and the second grid side converter by a dc link.

13. The generator of claim 11 further comprising an injection transformer connected to the second grid side converter.

14. The generator of claim 11 wherein the second grid side converter includes a rectifier bridge.

15. The generator of claim 11 wherein the second grid side converter includes a set of IGBTs and diodes arranged in a bridge.

16. A power conditioning system for a wind turbine having a blade arrangement connected to a generator having a stator and a rotor, and wherein rotation of the rotor by the blade arrangement causes the generator to induce electrical current flow through stator windings of the stator to a collector connected to a power grid, the system comprising:
an input connected to the stator windings;
a power switching network comprised of a plurality of switches and connected to the input, and wherein the plurality of switches are configured to be selectively switched to change magnetic flux in the stator windings; and
a controller connected to the power switching network and configured to provide switching commands to the plurality of switches so that an increase in voltage at the collector causes an increase in magnetic flux in the stator windings and a decrease in voltage at the collector causes a decrease in magnetic flux in the stator windings.

17. A power conditioning system for a wind turbine having stator windings and a collector connected to a power grid, the stator windings having a set of stator terminals and the collector having a set of grid terminals, and wherein the system comprises:
a power switching network connected between the stator terminals and the grid terminals and configured to scale magnetic flux in the stator windings in response to a voltage disturbance at the collector.

* * * * *